Dec. 26, 1967     R. F. WESTON     3,360,460

SURFACE AERATOR

Original Filed April 14, 1961

3,360,460
SURFACE AERATOR
Roy F. Weston, Sawmill Road,
Newtown Square, Pa. 19073
Continuation of application Ser. No. 103,167, Apr. 14, 1961. This application Jan. 11, 1965, Ser. No. 424,539
3 Claims. (Cl. 210—63)

This is a continuation of application Ser. No. 103,167 filed Apr. 14, 1961, now abandoned.

This invention relates to a method for mechanically dissolving gases above the free surface of a body of liquid in said body of liquid. More specifically, this invention relates to a method for aerating a body of liquid by the combined effect of a mechanically produced hydraulic pump and direct entrainment of gases from the atmosphere, and to a turbine type surface aerator which pulls in gases from the atmosphere in a highly efficient manner and mixes them with the entire body of liquid.

The term "air" is used herein for purposes of simplification to denote any gas, that may be dissolved in liquid, and "surface aeration" and "surface aerator" to denote the dissolving in a body of liquid of any gas present above the liquid surface, and the mechanism used therefor, respectively.

It is an object of this invention to provide an improved method for aerating a body of liquid by mechanical action near its surface.

Another object is to provide an improved method of aerating a body of liquid by controlled entrainment of atmospheric air into the low pressure areas existing on the trailing side of the blades of a turbine rotated below the liquid surface, and discharge toward the liquid surface of the entrained air together with liquid from the lower portion of the body of liquid pumped upwardly by the turbine.

Other objects of the invention will become apparent upon consideration of the specification and the claims which follow.

Mechanical aerators supplying oxygen from the atmosphere to a body of liquid in a basin, such as an activated sludge aeration basin, have been used for many years. However, due to their complicated construction and relatively high power consumption they were expensive in first cost and operation, and their capacity of supplying oxygen was low, being of the order of 1 to 2.0 lbs./HP/hr. Due to these limitations of prior art mechanical aerators, the trend in recent times was away from aeration by entrainment of atmospheric air and toward diffused air aeration, wherein air under predetermined pressure is diffused through porous plates, tubes and the like.

The oxygenation efficiency of compressed air diffusion is relatively low; moreover, the advantages of simpler and more economic construction are partly offset by the difficulties and expense involved in keeping the plates and tubes clean.

A great step forward in the art of aerating with compressed air was the relatively recently evolved technique of mechanically breaking up the compressed air into fine bubbles and dispersing these through a body of liquid by means of a submerged turbine type disperser. In this technique the compressed air usually enters through a sparger which may have relatively large openings, whereby clogging is avoided. The relatively large air bubbles issuing from the sparger are then mechanically broken up into air bubbles of a size best suitable for dissolving the oxygen in the liquid. The oxygen absorption efficiency of this combination of coarse bubble compressed air diffusion and mechanical breaking up of coarse into fine bubbles and their dispersion is much higher than that of compressed air diffusion alone. This higher efficiency was found to be due mainly to the fact that in this technique a portion of the power required per pound of oxygen dissolved per hour, is applied directly to the liquid, whereas in diffused air aeration all the power is used for compressing the air. These findings pointed in the direction of a return to surface aeration, where all power is applied directly to the liquid.

However, to improve over the results of combined diffused air and mechanical dispersion, an entirely new concept of surface aeration was required. It was found as the result of long studies, that a turbine type aerator placed subjacent the liquid surface, when properly shaped and dimensioned and rotated at suitable speed, creates in its vicinity a surface disturbance which may truly be called a mechanically produced hydraulic jump. The high oxygen absorption efficiency of hydraulic jumps, which may vary from 2 to 4 lbs. per HP per hr., is known in the art. To produce a hydraulic jump mcehanically, however, was an entirely new problem.

In extensive studies with a surface aerator of this type I have found that surface aeration can be further improved beyond the results obtainable by mechanically creating a hydraulic jump.

I have discovered that at high submergence a small hydraulic jump is formed, a measurable amount of oxygen is transferred and the power is practically constant as the submergence increases or as the submergence number decreases.

A second regime occurs as the submergence is decreased. In this regime the power decreases substantially as the submergence decreases. The oxygen transfer is increased appreciably.

As the submergence approaches zero, a third regime is encountered. The hydraulic jump disappears and gives way to a spraying type of action. Oxygen transfer drops off and power decreases but slightly.

Practically it has been demonstrated that the greatest quantity of oxygen is transferred by a turbine in the second regime and that the quantity increases as the operation approaches the third regime. Since the power required to operate the turbine decreases as the third regime is approached, it is obvious that the most economical oxygen transfer from the standpoint of pounds per horsepower per hour will occur within the second regime as the third regime is approached.

It is an important object of this invention to provide a surface aerator which is so dimensioned, so positioned relative to the liquid surface, and rotated at such a speed as to operate in said second regime.

I have found that the decrease in horsepower with decrease in submergence and increase in oxygen transfer in the second regime is due to air entrainment by the turbine. Since movement of a solid body through a body of liquid creates a low pressure area behind the moving body, there exists on the trailing side of each turbine blade, as it moves through the body of water, an area wherein the pressure is lower than the head due to submergence. When the submergence is decreased to a point where during rotation of the rotor the periphery of the rotor is in contact with atmospheric air as indicated in FIGURE 1, air will flow along the outer edges of the blades into the low pressure areas at the trailing sides of the blades. This air in the low pressure areas is entrained by the liquid passing through the rotor and entering the hydraulic jump, so that the over-all oxygenation efficiency of the surface aerator is materially increased.

This air entrainment interferes with the pumping capacity of the rotor which explains the decrease in horsepower with decreasing submergence. The influx of air must therefore be closely controlled, both as to quantity and location, to avoid reducing the pumping capacity of the rotor to a degree where the efficiency of the rotor would be adversely affected, and to still entrain the largest possible quantity of air.

I have discovered that the entrainment of air into the low pressure areas at the trailing sides of the blades can be effectively controlled by proper dimensioning and submergence of the rotor, and proper speed of rotation.

I have further discovered that the oxygenation efficiency of such an aerator can be further improved by providing means for inducing a positive flow of atmospheric air to the low pressure areas at the trailing side of the blades in addition to any air entering these areas by entrainment along the outer edges of the blades. Such means may be in the form of holes, slots or tubes extending through the aerator plate and exposed to the atmosphere when the plate is rotated.

When such an air flow is induced, great care must be taken with regard to the location of the points of air entry to prevent disturbing the liquid discharge effected by the rotor blades. Not only must these points be located on the trailing sides of the blades, but the distance between the blades and the blade proportions become of greatest importance.

The aerator design must provide a proper balance between liquid pumping and oxygen transfer. The pumping and oxygen transfer requirements vary with individual installations. Sufficient power must be provided to assure complete mixing of the air with the water and to maintain solids in the liquid in suspension. A large body of liquid with low oxygen requirements requires an aerator using relatively large quantities of power per pound of oxygen transfer, because relatively large quantities of water must be pumped to assure the transfer of oxygen to all parts of the body of liquid. On the other hand a small body of liquid with high oxygen requirements calls for an aerator using relatively small quantities of power per pound of oxygen transfer, because relatively small quantities of water must be pumped to assure complete mixing. By providing the proper relationship between speed of rotation, diameter of turbine plate, width, height and number of blades, and depth of submergence, the proper balance between liquid pumping and oxygen transfer can be obtained.

The optimum operating range for each turbine is determined by that peripheral speed and submergence which keeps the turbine plate during operation substantially free of water and exposes the peripheral edge of the plate to the atmosphere, to permit entrainment of air. If the edge of the plate is continuously or intermittently submerged during rotation, oxygen transfer is impaired. However, there is also a minimum submergence for any given aerator design. The submergence must always be sufficient to avoid that the discharge from the aerator is in the form of a spray, as described above for the third regime, instead of in the form of a hydraulic jump.

The power required to operate a turbine can be calculated. I have determined that in order to operate in the above described second regime wherein optimum balance is attained between power requirement and oxygen transfer, the most efficient and effective operation occurs when the ratio $$\frac{H_s}{H_v}$$

is within the range of from about 0.15 to about 0.30, and when the ratio $$\frac{H_s+h}{H_v}$$

is within the range of from about 0.10 to about 0.60, where $H_s$ is submergence head, ft.
$H_v$ is turbine peripheral velocity head $(\pi DN)^2/2g$, ft.
$h$ is height of blades, ft.
N is speed of rotation of turbine, revolution per sec.
D is diameter of turbine, ft.
$g$ is the gravity constant, 32.2 ft./sec.$^2$.

When $$\frac{H_s}{H_v}$$

is greater than about 0.30, there is unsteady operation because the turbine plate is not continuously free of water and the edge of the plate is not consistently exposed to the atmosphere. Consequently, the oxygen transfer is relatively low because air is not entrained by the turbine blades. When $$\frac{H_s+h}{H_v}$$

is less than about 0.10, the hydraulic jump is displaced by a spray discharge from the turbine. When the turbine discharge starts to spray, optimum air entrainment conditions cease and the oxygen transfer becomes relatively low per unit of horsepower expended.

A surface aerator designed and operated in accordance with the above described relationships will effect the most satisfactory balance between the water pumping all oxygen transfer requirements of varying and diverse installations. I have also found that a satisfactory balance between these requirements may be attained, and the formation of a hydraulic jump and influx of atmospheric air into the low pressure areas on the trailing sides of the blades, characteristic of the second regime, be assured, when the following relationships exist: (see FIGURE 1).

Height $h$ of the blades does not exceed 0.3 $H_v$
Width $w$ of the blades does not exceed 0.25 D
Submergence $H_s$ of the turbine plate below the normal liquid level under quiescent conditions does not exceed 0.3 $H_v$
Distance between blades = (0.8–5.0) × $w$
Peripheral speed of plate = 10–20′/sec.

Of these design criteria, the height of the blades and the submergence of the plate are of particular importance for the control of the quantity of air entrained along the edges of the blades. They are also important for the creation of an efficient hydraulic jump, for the principal physical conditions controlling the characteristics of the hydraulic jump, are the distance from the normal liquid surface L to the bottom of the blades 12 and the peripheral velocity of the turbine. The width of the blades is of particular significance for the pumping capacity of the rotor.

With regard to turbines provided with perforations the following has been observed:

(1) The area of the hole or holes associated with a blade must be at least 8 to 10 percent of the area of the respective blade, to assure optimum performance for the normal range of operating conditions. If the ratio of area of the hole to the area of the blade is less than about 8 percent, the operation of the turbine will be affected such that a straight line relationship will not be obtained in the critical operation regime a—b.

(2) The presence of holes significantly reduces the variability of power throughout the entire operating range and particularly at high submergence. The stabilizing effect may well mean the difference between a practical and impractical installation due to high maintenance.

(3) The presence of holes reduces the change in power consumption per unit change in submergence.

(4) The presence of holes increases the quantity of oxygen that can be transferred per horsepower applied to the turbine.

(5) The magnitude of the advantages of the presence of holes varies with the number of blades on the rotor. The advantage increases as the number of blades increases.

(6) The presence of holes broadens the operating range by making it possible to obtain optimum operation at lower $$\frac{H_s + h}{H_v}$$

ratios than is possible without holes.

The invention will be more readily understood by reference to the drawings wherein similar elements in the several figures are designated by the same reference characters.

Figure 1:
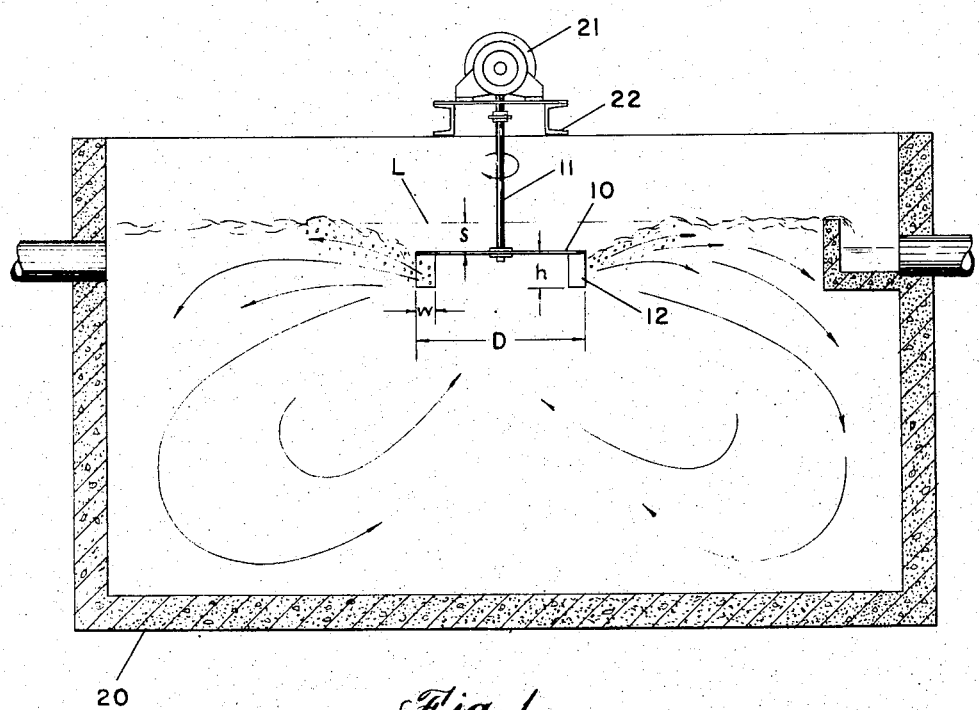
FIGURE 1 is a vertical cross-sectional view showing a surface aerator according to the invention installed in a basin and illustrating diagrammatically the flow pattern set up by it.
Figure 3:
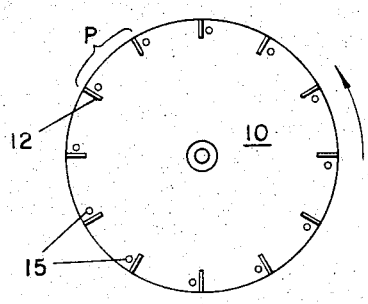
FIGURE 3 is a bottom view of the surface aerator of FIGURE 2.
Figure 2:
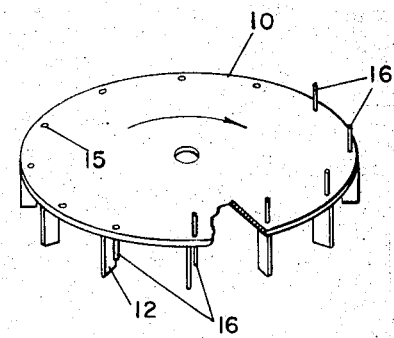
FIGURE 2 is a perspective view, partly broken away, of a surface according to the invention, provided with holes and tubes for inducing an air flow to the spaces on the trailing side of the blades.

As shown in FIGURES 1–3, the surface aerator is of the turbine type and comprises a plate 10 affixed to a rotatable shaft 11, and a plurality of blades 12 mounted on the lower side of plate 10 and extending downwardly therefrom and inwardly from the periphery of the plate toward the shaft.

As shown in FIGURE 1, the surface aerator is installed in a basin 20 of any suitable form, such as round or square, with the plate 10 in substantially horizontal position and the shaft 11 connected to a motor-reducer 21 which may rest on a beam or bridge 22 supported from a floating raft, or from the bottom of the basin, or, as shown, by the wall of the basin 20. The aerator is so dimensioned relative to the basin that its flow pattern covers substantially the entire basin. With larger basins two or more aerators can be installed. When the basin is very deep, it may be advantageous to use, in addition to the surface aerator, a mixer, not shown, which assists the aerator in keeping the lower portions of the basin well mixed. If desired, a mechanical gas disperser, not shown, using compressed air may be provided instead of a mixer in the lower part of the basin. Ordinarily, however, there will be so much dissolved oxygen in the liquid after it has traversed the hydraulic jump, that all that may be required in a very deep tank, in addition to the surface aerator, is a mixer.

Under quiescent conditions the plate 10 of the aerator is subjacent the liquid level L in basin 20. Upon its rotation at the proper speed, the plate will be substantially free of water and its peripheral edge exposed to the atmosphere, whereby air is entrained along the outer edges of the blades into the low pressure areas at their trailing side. The aerator will pump large quantities of liquid upwardly from the lower portions of the body of liquid and discharge the liquid, together with the air which has entered the areas at the trailing side of the blades, outwardly through the passages between the blades. The discharge of these large quantities of liquid mixed with air at the liquid surface creates a hydraulic jump in the vicinity of the periphery of the rotor, as indicated in FIGURE 1. Due to the turbulence in the hydraulic jump further quantities of atmospheric air are entrained and a great part of its oxygen dissolved in the liquid in the jump and carried along by the liquid as it flows along the liquid surface and downwardly to the bottom of the basin, to be again pumped upwardly by the aerator.

To induce an additional flow of atmospheric air to the low pressure area on the trailing side of the blades 12, the plate 10 may have one or more perforations 15 adjacent the trailing side of some or all of the blades 12. These perforations are clearly shown in FIGURES 2 and 3 and may be in the form of slots or of holes, as shown. Ordinarily the perforations alone will be sufficient to obtain the desired influx of atmospheric air; however, tubes such as shown at 16 in FIGURE 2 may be used and extend through the perforations upwardly to an elevation above plate 10, and may also extend downwardly from the plate into the low pressure space, if desired. During rotation of the plate 10, the perforations 15 and the upper ends of the tubes 16 will be exposed to the atmosphere and air will enter the low pressure areas at the trailing sides of the blades. This air is entrained by the liquid passing through the rotor and entering the hydraulic jump, so that the over-all oxygenation efficiency of the surface aerator is further increased. However, great care must be taken in inducing this flow of atmospheric air to avoid reducing the liquid pumping capacity of the aerator to a degree that the balance between pumping and oxygen transfer is disturbed.

In a surface aerator operating on the principle of a hydraulic jump, air must not be permitted to become entrained in large quantities into the center or eye of the rotor of the aerator, as is usual with the prior art mechanical aerators. With these prior art mechanical aerators the concept is to pump by rotation of a submerged rotor a considerable volume of water from above the rotor into its eye and to entrain atmospheric air by the water entering the rotor. In my surface aerator the quantity of air allowed to enter the rotor and the locations of entry are strictly controlled. No liquid is pumped into the rotor from above and air is not sucked into the center of the rotor by liquid from above the rotor. Instead air is induced to flow in a plurality of streams along the edges of the blades and through the holes or tubes, if such are provided, to the low pressure areas on the trailing sides of the blades. The height and width of the blades as well as the holes or tubes are sized to provide for the proper amount of air to enter these spaces, and the blades are spaced from each other so that the body of air behind each blade can be entrained by the body of liquid discharged in front of the adjacent blade without adversely affecting the free discharge of liquid required for the hydraulic jump. If the distance between individual blades is too small, air will not be entrained in the normal manner.

The controlled entrainment of atmospheric air in the low pressure areas on the trailing sides of the blades not only improves the over-all oxygenation efficiency of the surface aerator, but permits variations in its submergence within a relatively broad range without materially affecting the oxygenation capacity of the unit. However, the submergence of the plate must always be such that the liquid covering the plate when it is at rest is thrown outwardly and the upper side of the plate is substantially free of liquid during rotation of the plate, so that the peripheral edge of the plate 10 and the perforations 15 become exposed to the atmosphere. This permits atmospheric air to enter the low pressure areas on the trailing sides of the blades 12 without entrainment of liquid into these areas.

*Examples of criticality*

The criticality of turbine dimensions, operating conditions and the ratios $H_s/H_v$ and $H_s+h/H_v$ as illustrated in the following examples:

| Diameter of Turbine D | h | $H_s$ | $H_v$ | $H_s/H_v$ | $H_s+h/H_v$ | HP | Oxygen Transfer, lbs./hr. | Oxygen Transfer, lbs./HP hr. | Remarks |
|---|---|---|---|---|---|---|---|---|---|
| 1.25' | 0.083' | 0.917' | 2.53' | 0.36' | 0.40' | 1.58 | 1.34 | 0.8 | Operation in first regime. |
| 1.25' | 0.083' | 0.458' | 2.24' | 0.20' | 0.24' | 0.68 | 1.56 | 2.3 | Operation in second regime. |
| 1.25' | 0.083' | 0.458' | 5.58' | 0.08' | 0.10' | 1.91 | 2.74 | 1.4 | Operation in third regime. |
| 2.00' | 0.333' | 0.344' | 1.725' | 0.20' | 0.39' | 1.6 | 7.29 | 4.6 | Barely inside critical operating regime (second regime). |
| 2.00' | 0.333' | 0.490' | 3.20' | 0.15' | 0.26' | 2.1 | 13.9 | 6.6 | Well within second regime. |
| 2.00' | 0.333' | 0.333' | 4.42' | 0.08' | 0.15' | 3.1 | 11.4 | 3.7 | Operation in third regime. |
| 2.00' | 1.500' | 0.333' | 1.725' | 0.19' | 1.06' | 2.25 | 4.17 | 1.9 | Operation in first regime close to transition point a. |
| 2.00' | 1.500' | 0.021' | 3.25' | 0.01' | 0.47' | 4.3 | 14.5 | 3.4 | Shows improvement in oxygen transfer due to operation well within second regime. |

I claim:

1. A method of dissolving gases present above the free surface of a body of waste water with a generally horizontal plate of imperforate construction at least at its center portion, said plate having a plurality of spaced-apart blades extending downwardly from said plate at least partly inwardly from the periphery thereof, said method comprising submerging said plate subadjacent the free surface of the water; rotating said plate about a vertical axis through its center; and economically entraining gases in said waste water by operating in a regime in which high gas dissolution occurs with low consumption of power by said plate, said entraining operation including adjusting the submergence level and speed of rotation of said plate to effect a ratio of submergence head to peripheral velocity head of not substantially greater than 0.3 and to effect a ratio of submergence head plus blade height to peripheral velocity head within the range of about 0.1 to about 0.6, said entraining operation inducing the water to flow outwardly along said blades and to develop low pressure areas at the trailing edges of said blades and simultaneously inducing gas which is above the surface of the body of water to contact substantially the entire upper surface and the periphery of said plate and to flow into the low pressure areas at the trailing side of said blades.

2. The method of claim 1 wherein said entraining operation includes the step of inducing a flow of gas downwardly through the plate at locations on the trailing side of the blades.

3. A method of dissolving gases present above the free surface of a body of waste water with a generally horizontal plate of imperforate construction at least at its center portion, said plate having a plurality of spaced-apart blades extending downwardly from said plate at least partly inwardly from the periphery thereof, said method comprising submerging said plate subadjacent the free surface of the water; rotating said plate about a vertical axis through its center; and economically entraining gases in said waste water by operating in a regime in which high gas dissolution occurs with low consumption of power by said plate, said entraining operation including adjusting the operation of said plate to conform to the following relationships:

$h$ is not greater than $0.3\ H_v$
$H_s$ is not greater than $0.3\ H_v$
$w$ is not greater than $0.25\ D$ where $h$ is the blade height, $H_v$ is peripheral velocity head of the rotating plate, $H_s$ is the submergence head of the plate below the free surface of the water, $w$ is the blade width and $D$ is the diameter of the plate, said entraining operation inducing the water to flow outwardly along said blades and to develop low pressure areas at the trailing edges of said blades and simultaneously inducing gas which is above the surface of the body of water to contact substantially the entire upper surface and the periphery of said plate and to flow into the low pressure areas at the trailing side of said blades.

References Cited

UNITED STATES PATENTS

| 121,560 | 12/1871 | Ward | 259—96 |
| 391,787 | 10/1888 | Friend | 259—96 |
| 1,110,914 | 9/1914 | Feld. | |
| 1,242,445 | 10/1917 | Ittner. | |
| 2,678,912 | 5/1954 | Kalinske et al. | 210—219 |
| 3,154,601 | 10/1964 | Kalinske et al. | 261—93 |

HARRY B. THORNTON, *Primary Examiner.*

R. R. WEAVER, *Assistant Examiner.*